United States Patent [19]

Okubo et al.

[11] Patent Number: 4,646,584
[45] Date of Patent: Mar. 3, 1987

[54] VEHICULAR TRANSMISSION SELECT AND SHIFT MECHANISM

[75] Inventors: Kiyokazu Okubo; Shunji Sakuma, both of Saitama, Japan

[73] Assignee: Honda Giken Kogyo Kabushiki Kaisha, Tokyo, Japan

[21] Appl. No.: 785,467

[22] Filed: Oct. 8, 1985

[30] Foreign Application Priority Data

Oct. 9, 1984 [JP] Japan ................. 59-211909
Oct. 9, 1984 [JP] Japan ................. 59-211901

[51] Int. Cl.⁴ ................. B60K 23/08; G05G 5/10
[52] U.S. Cl. ................. 74/475; 74/477; 180/247
[58] Field of Search ........ 74/475, 477; 180/247, 180/248, 249, 250

[56] References Cited

U.S. PATENT DOCUMENTS

| | | | |
|---|---|---|---|
| 4,174,644 | 11/1979 | Nagy et al. | 74/477 |
| 4,290,318 | 9/1981 | Ookubo et al. | 180/247 X |
| 4,305,309 | 12/1981 | Ookubo et al. | 180/247 X |
| 4,356,879 | 11/1982 | Uchiyama | 180/247 |
| 4,421,335 | 12/1983 | Makishima et al. | 74/477 X |
| 4,466,306 | 8/1984 | Katayma | 180/247 X |
| 4,545,457 | 10/1985 | Iwata | 180/247 |

Primary Examiner—Rodney H. Bonck
Assistant Examiner—Alan G. Towner
Attorney, Agent, or Firm—Lyon & Lyon

[57] ABSTRACT

A vehicular transmission having multiple gear trains including an ultra-low speed for all-wheel operation. A gear train selecting and shifting mechanism includes a select shaft and a shift shaft rotatably mounted perpendicular to each other. A shift piece slidably mounted on another shaft for engaging the shift forks for establishing the selected gear train. An arm is mounted on the select shaft for pivoting thereby and engages the shift piece for selecting the desired shift fork. Another arm is mounted on the shift shaft for pivoting thereby and engages the shift piece for causing shifting of the gear trains. Push-pull wires are provided from the driver's position for causing rotation of the select and shift shafts through external levers. An interlock plate prevents selection of the shift fork for the ultra-low speed unless a transfer gear clutch is engaged for all-wheel vehicle operation.

12 Claims, 13 Drawing Figures

VEHICULAR TRANSMISSION SELECT AND SHIFT MECHANISM

The present invention relates to a vehicular transmission having plural gear trains that are capable of being established selectively between input and output shafts, and, in particular, to the mechanism for selecting and shifting among the gear trains. More specifically, this invention is applicable to such a transmission wherein, a sub speed change mechanism is provided with a reduction gear train for obtaining a still lower speed than the lowest shifting stage in the main speed change mechanism.

Conventional vehicular transmissions, especially manual transmissions, have four to five forward shifting stages, but in some particular running conditions of the vehicle an ultra-low speed still lower than the lowest conventional speed is required. This is particularly true of an all-wheel drive vehicle wherein operation at an ultra-low speed is required in order to overcome difficult operating conditions. There are conventional transmissions provided with a sub speed change mechanism for an ultra-low speed in addition to a main speed change mechanism but they have various disadvantages.

In one form of conventional multi-speed vehicular transmission, a single change rod or control rod is engaged with both a shift arm and a select arm, and shift and select operations are performed by an axial movement and a pivotal motion of the change rod or control rod. However, in a transmission of the type in which the select and shift operations are performed by converting the operation of a change lever into push-pull motions of a wire, it is impossible to adopt the above conventional system. In an effort to solve this problem, there has been proposed a method in which shift and select arms are omitted and instead a shift piece and a shift piece shaft are slid or rotated directly by wire. In such proposed method, however, it is necessary to dispose a bell crank exteriorly of the select/shift mechanism, and so such method is not desirable from the standpoint of correlation in arrangement with the other vehicular components.

Another problem with multi-speed transmissions for vehicles having selective two-wheel or all-wheel drive when there is an ultra-low speed gear train is that an inadvertent selection of that ultra-low speed while the vehicle is operating in two-wheel rather than all-wheel drive may impose too great a load on the two-wheel drive train.

In view of the above circumstances, the present invention has as a principle object the provision of a vehicular transmission having a select/shift mechanism in which shift and select arms are operated each independently to respond to select and shift operations performed by push-pull wires. A further object of this invention is to provide a detent mechanism in proximity to the shift piece to positively control the positions of the shift piece to avoid improper strokes of the push-pull wire and provide an improved operational feeling for the driver.

Another object of this invention is to provide a select/shift mechanism for multi-speed transmission that has an additional ultra-low speed drive only for all-wheel drive and unique means for preventing the selection of that ultra-low speed drive while the vehicle is operated in two-wheel drive.

An embodiment of the present invention will now be described with reference to the drawings, wherein.

Figure 1:
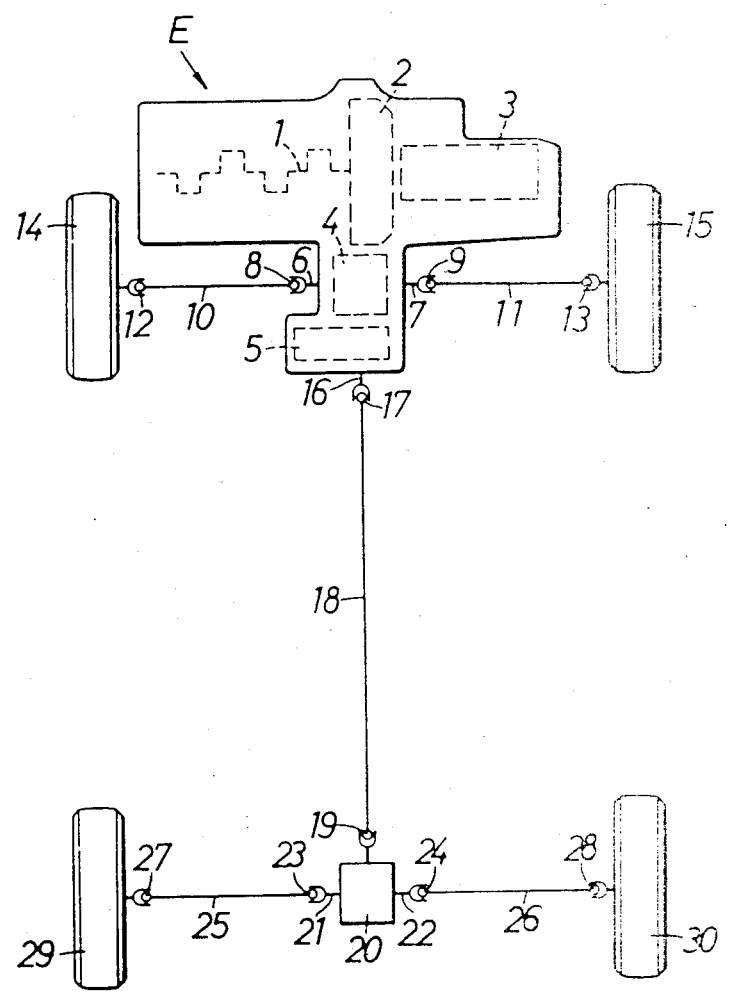
FIG. 1 is a schematic diagram of an entire transmission system of a vehicle provided with a transmission embodying the invention.

Referring first to FIG. 1, an engine E is disposed laterally in the front portion of a vehicle body, namely, disposed so that its crankshaft 1 is perpendicular to the length and advancing direction of the vehicle. On one side of the engine E is disposed a transmission system which comprises a clutch 2, a transmission 3, a front wheel driving differential gear 4 and a transfer mechanism 5. The driving force of the engine E is transmitted to the front wheel driving differential gear 4 through the clutch 2 and transmission 3. This force is further transmitted to left and right front wheels 14 and 15 through drive shafts 6 and 7, synchronous joints 8 and 9, transmission shafts 10 and 11 and synchronous joints 12 and 13. This driving force may also be transferred selectively to a drive shaft 16 through the transmission 3 and the transfer 5. From the drive shaft 16 the driving force is transmitted to a rear wheel driving differential gear 20 through a universal joint 17, a propeller shaft 18 and a universal joint 19, and then from the differential gear 20 it is transmitted to left and right rear wheels 29 and 30 through drive shafts 21 and 22, synchronous joints 23 and 24, transmission shafts 25 and 26 and synchronous joints 27 and 28.

Figure 2:
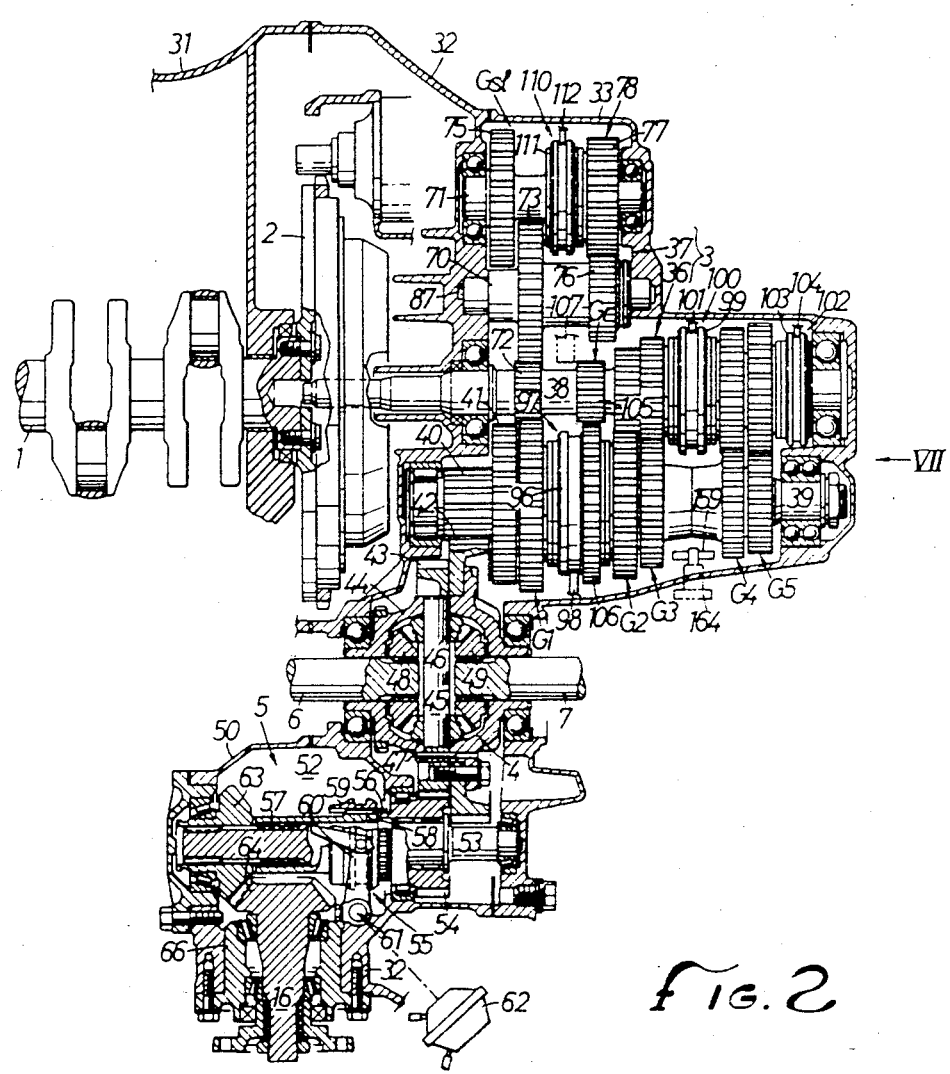
FIG. 2 is a longitudinal sectional development view of a transmission system including the transmission of this invention.

In FIG. 2 which shows details of the transmission system, a clutch case 32 is fixed to one side of a crank case 31 of the engine E, and a transmission case 33 is fixed to the clutch case 32.

The clutch 2, which is of a known structure, is housed within the clutch case 32, and the transmission 3 is housed within the transmission case 33. The transmission 3 comprises a main speed change mechanism 36 and a sub speed change mechanism 37. The main speed change mechanism 36 comprises first, second, third, fourth, fifth and reverse gear trains G1, G2, G3, G4, G5 and Gr which are disposed between an input shaft 38 coaxial with the crankshaft 1 and an output shaft 39 parallel with the input shaft 38. The driving force which has been transmitted from the input shaft 38 to the output shaft 39 through a selected one of these gear trains G1, G2, G3, G4, G5 and Gr is output by an output gear 40 mounted on the output shaft 39 at an end portion near the engine E.

Figure 3:
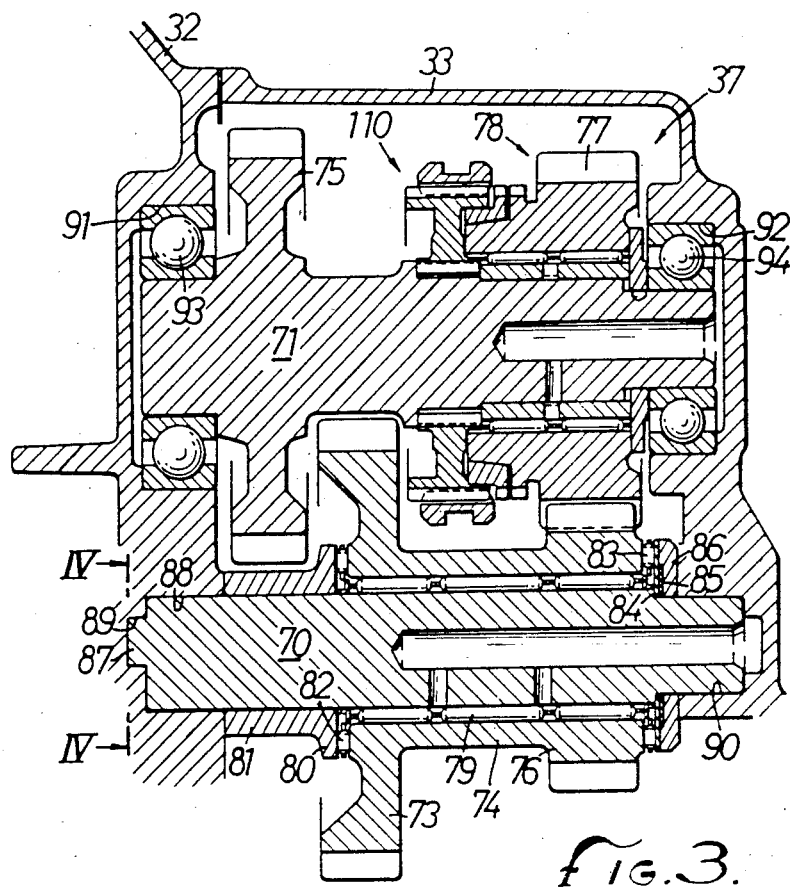
FIG. 3 is an enlarged longitudinal sectional view of the sub speed change mechanism portion of the transmission shown in FIG. 2.

Referring also to FIG. 3, the sub speed change mechanism 37, which is used for an ultra-low speed even lower than the first speed range G1 during all-wheel driving, has an intermediate shaft 70 and a counter shaft 71 both parallel with the input and output shafts 38 and 39, and is disposed in a position close to the clutch 2 within the transmission case 33. The intermediate shaft 70 is fixedly supported at both ends thereof by the clutch case 32 and the transmission case 33, and a counter input gear 73 is rotatably supported on the intermediate shaft 70. The counter input gear 73 is continually in mesh with a gear 72 integral with the input shaft 38 that forms part of the first gear train G1. The counter shaft 71 is supported rotatably by the clutch case 32 and the transmission case 33, and integral therewith is a counter output gear 75 which is continually in mesh with a reduction gear 41 integral with the output shaft 39. Further, a gear 76 which is integral with the counter input gear 73, and a gear 77 which is supported for relative rotation on the counter shaft 71, are continually engaged with each other to constitute a reduction gear train 78. The counter input gear 73, reduction gear train 78 and counter output gear 75 constitute an ultra-low gear train Gs.

The counter input gear 73 and the gear 76 are provided integrally at both ends of a cylindrical body 74, with a bearing 79 being disposed between the cylindrical body 74 and the intermediate shaft 70. More specifically, the counter input gear 73 is integrally provided at one end of the cylindrical body 74 on the side of the clutch case 32, and the gear 76 is integrally provided at the other end of the cylindrical body 74. Further, between the counter input gear 73 and the clutch case 32 is disposed a cylindrical collar 81 which has a support flange 80 on the side of the counter input gear 73 and which surrounds the intermediate shaft 70. And a thrust bearing 82 is disposed between the support flange 80 of the collar 81 and the counter input gear 73. Between the gear 76 and the transmission case 33 are disposed a thrust bearing 83, a washer 84, a coned disc spring 85 and a washer 86 successively from the side of the gear 76 toward case 33.

Figure 4:
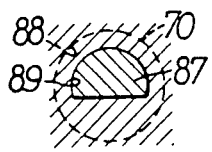
FIG. 4 is a sectional view taken substantially on the line IV—IV of FIG. 3.

For assembling the sub speed change mechanism 37, the intermediate shaft 70 is inserted in the cylindrical body 74 and collar 81 in an engaged state of the counter input gear 73 with the gear 72 of the input shaft 38 and the gear 76 with the gear 77 of the counter shaft 71. The intermediate shaft 70 is generally cylindrical and formed with a rotational stop lug 87 of a non-circular cross-section at the end face thereof on the side of the clutch case 32. The clutch case 32 is formed with a support hole 88 of a circular cross-section in which is fitted and supported one end portion of the intermediate shaft 70. The bottom of the support hole 88 is formed with a non-circular concave portion 89 for receiving the stop lug 87. As shown in FIG. 4, the stop lug 87 may be formed generally semi-circularly in cross-section, and the cross-section of the concave portion 89 is also in the form of a semi-circle corresponding to the stop lug 87. In the transmission case 33 is formed a support hole 90 of a circular cross-section in which is fitted and supported the other end portion of the intermediate shaft 70.

The counter shaft 71 is supported rotatably by the clutch case 32 and the transmission case 33. More specifically, it is supported through bearings 93 and 94 in concave portions 91 and 92 formed in the clutch case 32 and transmission case 3, respectively.

Referring again to FIG. 2, a gear box 44 of the front wheel driving differential gear 4 is supported rotatably by the clutch case 32 and transmission case 33, and a reduction ring gear 42 is engaged with the output gear 40 of the transmission 3. The reduction ring gear 42 and a drive gear 43 smaller in diameter than the reduction ring gear 42 are parallel to each other and fixed to the gear box 44. The left and right front wheel driving shafts 6 and 7 extend into the gear box 44 in opposed relation to each other and a support shaft 45, which extends between and perpendicularly to the drive shafts 6 and 7, is fixed to the gear box 44. Bevel gears 46 and 47 are fixed to the two ends of support shaft 45 and bevel gears 48 and 49, which mesh with the bevel gears 46 and 47, are splined to inner ends of the drive shafts 6 and 7, thereby forming the differential 4.

The clutch case 32 and the transmission case 33 extend more rearward than the front wheel driving differential gear 4, and to the rear end of the clutch case 32 is integrally fixed a transfer case 50 to form a chamber 52 for housing the transfer 5 therein. The transfer 5 has a transfer shaft 53 which is parallel with the paired drive shafts 6 and 7 and the transfer shaft 53 is rotatably supported by the cases 32, 33 and 50. A driven gear 54, which is continually in mesh with the drive gear 43 integral with the gear box 44, is supported rotatably on an end portion of the transfer shaft 53 close to the transmission case 33. Between the transfer shaft 53 and the driven gear 54 is provided a gear clutch mechanism 55 which connects and disconnects the power transmission therebetween.

The gear clutch mechanism 55 comprises a gear 56 provided integrally on one side of the driven gear 54, a gear 58 provided at one end of a collar 57 which is splined to the transfer shaft 53; an axially slidable sleeve 59 which is continually in mesh with the gear 58 and which is engageable with and disengageable from the gear 56; a yoke 60 engaged with the outer periphery of the sleeve 59; and a rocking shaft 61 for rocking the yoke 60. The rocking shaft 61 is pivotally supported by the clutch case 32 perpendicularly to the transfer shaft 53. To the rocking shaft 61 is connected an actuator 62 such as, for example, a negative pressure actuator, whereby the rocking shaft 61 and yoke 60 are driven for rocking motion.

In the gear clutch mechanism 55, if the yoke 60 is pivoted to the right side, as viewed in FIG. 2, by the actuator 62, the sleeve 59 slides rightwards and engages and extends over both gears 58 and 56, whereby the driving force of the driven gear 54 is transferred to the transfer shaft 53. On the other hand, when the yoke 60 is pivoted to the left side, as shown in FIG. 2, the sleeve 59 is disengaged from the gear 56 to cut off the power transmission between the driven gear 54 and the transfer shaft 53.

A driving bevel gear 63 is fixed to an end portion of the transfer shaft 53 on the side of the transfer case 50 and it is in mesh with a driven bevel gear 64 which is integrally provided at an end portion of the drive shaft 16. The drive shaft 16 is disposed perpendicularly to the transfer shaft 53 and is supported rotatably by a bearing cylinder 66 which extends into the clutch case 32 and the transfer case 50.

The construction of the apparatus for selecting the gear trains G1, G2, G3, G4, G5 and Gr in the main speed change mechanism 36 of the transmission 3 and the ultra-low gear train Gs in the sub speed cage mechanism 37 will now be described. On the portion of the output shaft 39 between the first and second gear trains G1 and G2 is mounted a first/second gear shifting synchronizing mechanism 97 for switching the state of connection between the gear trains G1, G2 and the output shaft 39 with left- or rightward movement of a select sleeve 96. A first/second gear shift fork 98 is in engagement with the select sleeve 96. On the portion of the input shaft 38 between the third and fourth gear trains G3 and G4 is mounted a third/fourth gear shifting synchronizing mechanism 100 for switching the state of connection between the gears G3, G4 and the input shaft 38 with left- or rightward movement of a select sleeve 99. And a third/fourth gear shift fork 101 is in engagement with the select sleeve 99. Further, a fifth gear shifting synchronizing mechanism 102 for switching over the state of connection between the fifth gear train G5 and the input shaft 38 is mounted on an end portion of the input shaft 38 on the side away from the clutch 2, and a fifth gear shift fork 104 is in engagement with a select sleeve 103 of the synchronizing mechanism 102.

Figure 5:
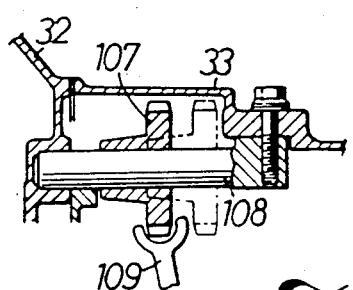
FIG. 5 is a longitudinal sectional view showing an idle gear which constitutes a portion of the reverse gear train.

The reverse gear train Gr comprises a drive gear 105 which is integral with the input shaft 38; a driven gear 105 which is mounted integrally with the select sleeve 96 of the first/second gear shifting synchronizing mechanism 97 and whose rotation relative to the output shaft 39 is prevented; an idle gear 107 movable between a position in which it engages the drive gear 105 and driven gear 106 and a position in which it disengages from those gears. The drive gear 105 and driven gear 106 are not in mesh with each other. As shown in FIG. 5, the idle gear 107 is slidably supported by an idle gear shaft 108 which is parallel to the input and output shafts 38 and 39 and which is fixedly supported by the clutch case 32 and transmission case 33. The idle gear 107 is engaged by a reverse shift fork 109. By operation of the shift fork 109, the idle gear 107 can be moved between the position in which it engages both gears 105 and 106 to establish the reverse gear train Gr and the position in which it is disengaged from both gears 105 and 106.

In the sub speed change mechanism 37, an ultra-low gear shifting synchronizing mechanism 110 for switching the state of connection between the gear 77 and the counter shaft 71 is mounted on the counter shaft 71. An ultra-low gear shift fork 112 is engaged with a select sleeve 111 of the synchronizing mechanism 110.

Figure 6:
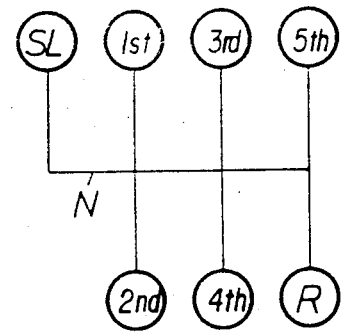
FIG. 6 illustrates a shift pattern.
Figure 7:
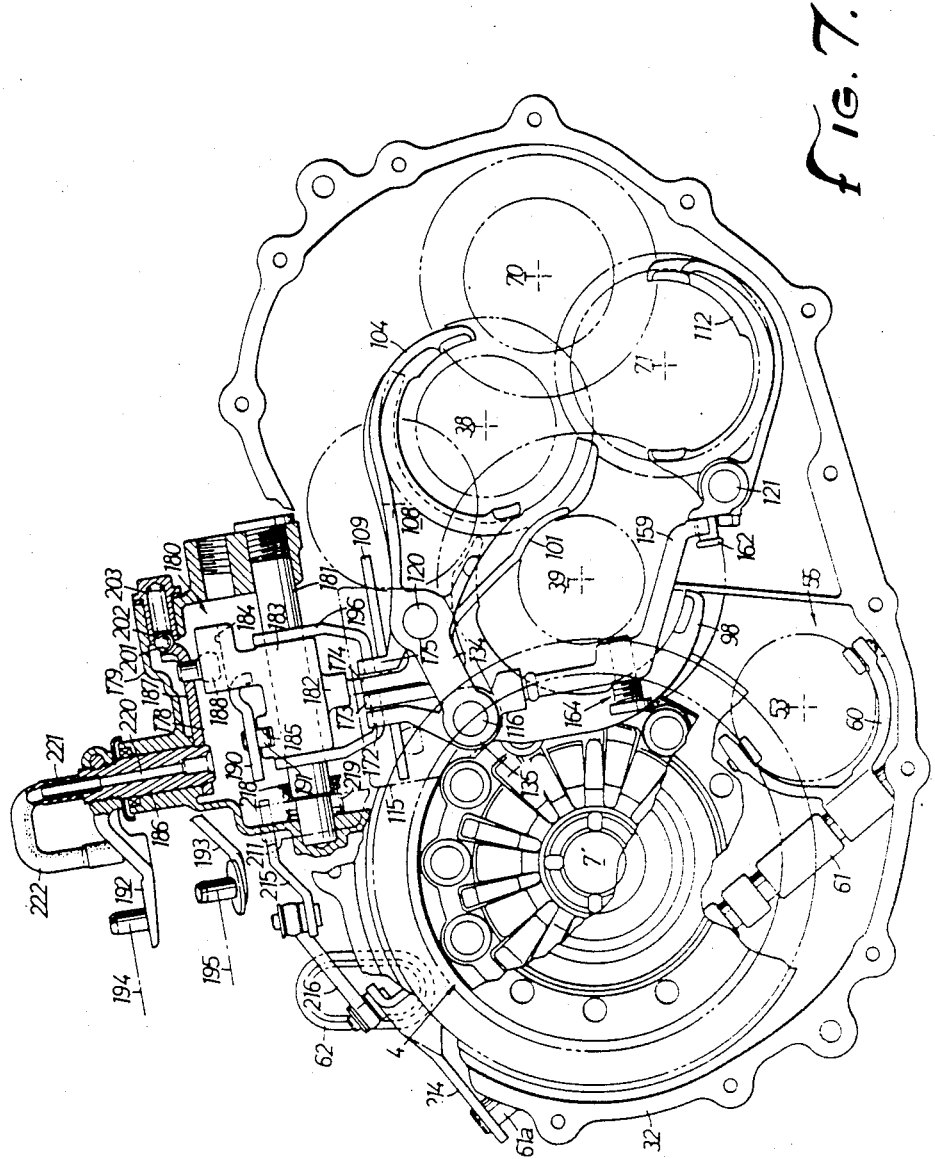
FIG. 7 is a transverse sectional side view as seen in the direction of arrow VII in FIG. 2.
Figure 8:
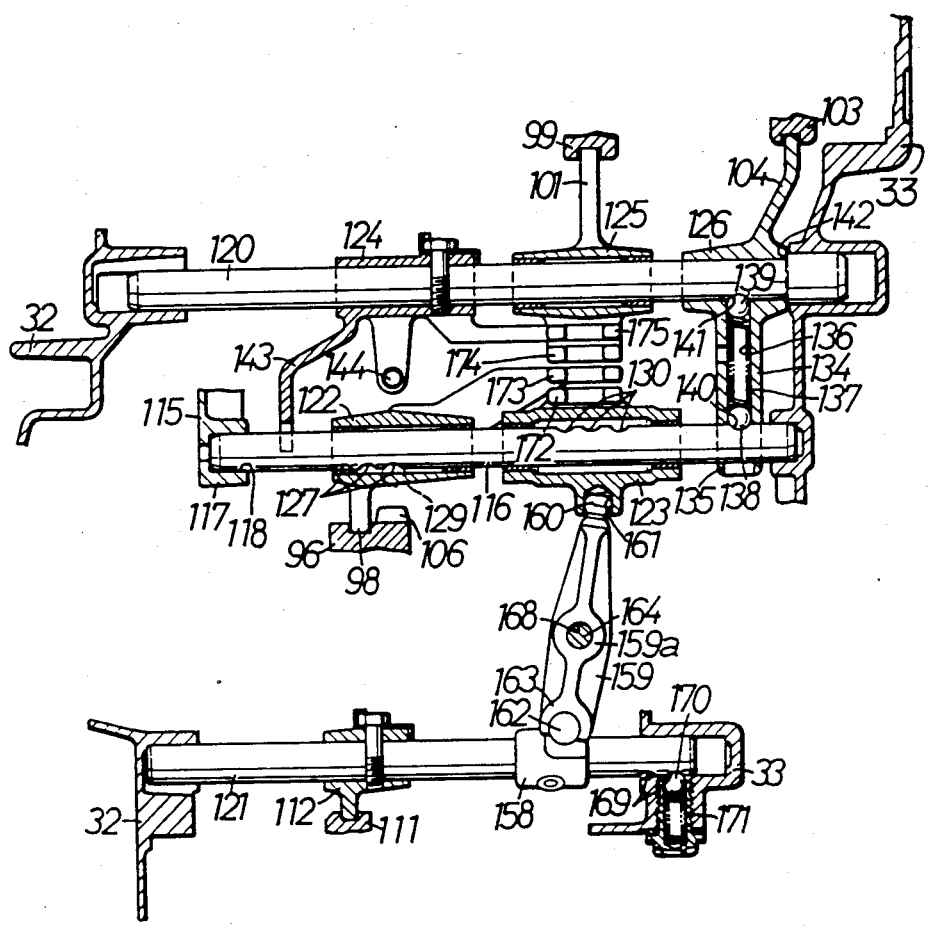
FIG. 8 is a plan view with portions in section showing the arrangement of the shift forks.
Figure 9:
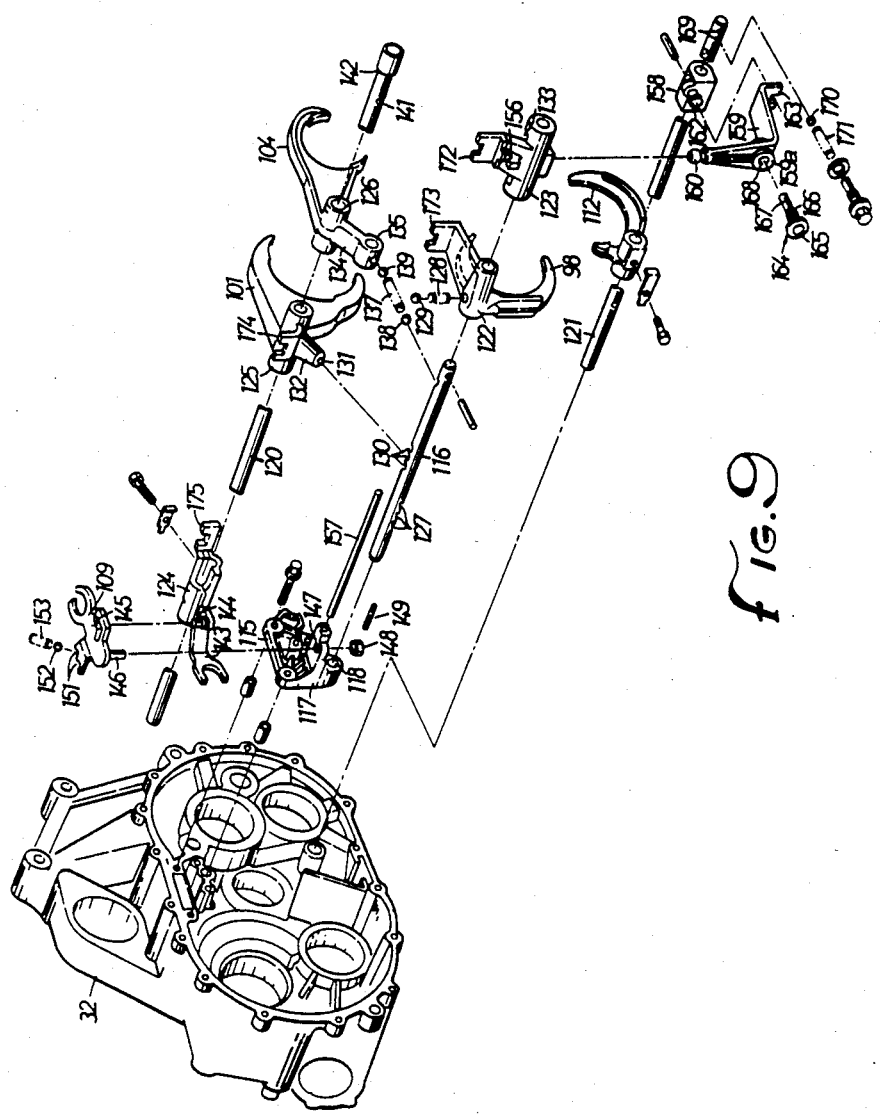
FIG. 9 is an exploded perspective view showing the operation systems of the shift forks.

FIG. 6 shows a shift pattern, in which N, 1st, 2nd, 3rd, 4th, 5th and R represent neutral, first, second, third, fourth, fifth and reverse gear positions, respectively, and an ultra-low gear position SL is adjacent to the first gear position 1st. According to such shift pattern, the shift forks 98, 101, 104, 109 and 112 are disposed as shown in FIGS. 7 to 9.

Figure 10:
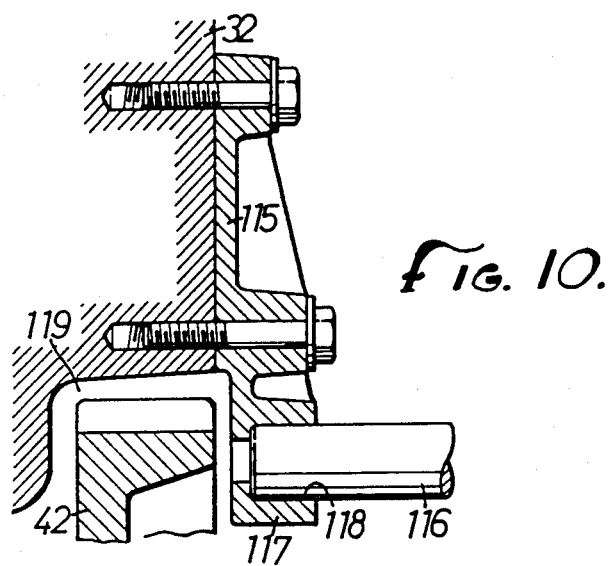
FIG. 10 is a longitudinal sectional side view of a shaft holder as mounted to a clutch case.

More specifically, to the clutch case 32 is fixed a shaft holder 115 which faces the transmission case 33 side and a first fork shaft 116 that is parallel to the input shaft 38 and output shaft 39 is fixed in an extending state between the shaft holder 115 and the transmission case 33. As shown in FIG. 10, the shaft holder 115 is provided with an overhang portion 117 which extends toward the front wheel driving differential gear 4. The overhang portion 117 is formed with a support hole 118 for receiving therein and supporting the first fork shaft 116.

Moreover, the overhang portion 117 extends to a position for forming a gap 119 between it and the peripheral edge of the reduction ring gear 42 and holding the gear 42 between it and the clutch case 32.

Second and third fork shafts 120 and 121 are parallel to the first fork shaft 116 and are supported between the clutch case 32 and the transmission case 33 so as to be reciprocable within a limited range along their axes. Slidably mounted on the first fork shaft 116 are (1) a first/second gear shifting fork head 122 that includes integrally therewith the first/second gear shifting shift fork 98 and (2) an ultra-low fork head 123. A reverse fork head 124 is fixedly mounted on the second fork shaft 120. A third/fourth gear shifting fork head 125 integral with the third/fourth gear shift fork 101 and a fifth gear fork head 126 integral with the fifth gear shift fork 104 are slidably supported on the second fork shaft 120. Further, the ultra-low shift fork 112 is fixed onto the third fork shaft 121.

Three axially spaced recesses 127 are formed on the outer surface of the first fork shaft 116 in opposed relation to the first/second gear shifting fork head 122. The fork head 122 holds a ball 129 which is urged in the direction of engagement with those recesses by the biasing force of a spring 128, whereby a detent mechanism is constituted. As a result of these three detent positions, the first/second gear shifting fork head 122 and hence the first/second gear shift fork 98 can be moved selectively among a position (left position in FIG. 8) in which the select sleeve 96 is moved to the left in FIG. 2 to establish the first shift stage, a position (central position in FIG. 8) in which the select sleeve 96 is positioned centrally into a neutral state, and a position (right position as actually shown in FIG. 8) in which the select sleeve 96 is moved to the right in FIG. 2 to establish a second shift stage.

Further, three axially spaced recesses 130 are formed on the outer surface of the first fork shaft 116 in positions corresponding to the third/fourth gear shifting fork head 125 which is slidably supported on the second fork shaft 120, and a ball 131 capable of being fitted in those recesses 130 is held by a projecting portion 132 of the third/fourth gear shifting fork head 125, the ball 131 being urged in the direction of engagement with the recesses 130 by means of a spring (not shown), whereby a detent mechanism is constituted. As a result, the third/fourth gear shifting fork head 125 and hence the third/fourth gear switching shift fork 101 can be moved selectively among a position (left position in FIG. 8) in which the select sleeve 99 is moved to the left in FIG. 2 to establish the third shift stage, a position (central position in FIG. 8) in which the select sleeve 99 is positioned centrally into a neutral state and a position (right position in FIG. 8) in which the select sleeve 99 is moved to the right in FIG. 2 to establish the fourth shift stage.

It should be noted that the third/fourth gear shifting fork head 125 is located in a position corresponding to the position of the ultra-low fork head 123 which is slidably supported on the first fork shaft 116, and that the ultra-low fork head 123 is provided with a notch 133 for allowing the projecting portion 132 of the third/fourth gear shifting fork head 125 to extend toward and close to the first fork shaft 116. The length of the notch 133 along the axial direction of the first fork shaft 116 is determined so as to allow relative movement between the ultra-low fork head 123 and the third/fourth gear shifting fork head 125.

The fifth gear fork head 126 is integrally provided with an arm 134 which extends toward the first fork shaft 116. At the fore end of the arm 134 is formed a cylindrical portion 135 for insertion of the first fork shaft 116 therethrough. In the arm 134 is formed a hole 136 extending between the first and second fork shafts 116 and 120, and in the hole 136 are inserted a pair of balls 138 and 139 which are urged in directions away from each other by means of a spring 137. On the outer surfaces of the first and second fork shafts 116 and 120 are formed recesses 140 and 141 for receiving the balls 138 and 139 therein. By the engagement of the balls 138 and 139 in the recess 140 and 141, the position of the fifth gear fork head 126 is releasably retained. In this state, the fifth gear shifting synchronizing mechanism 102 is kept inoperative, and the fifth gear train G5 and the input shaft 38 are disengaged from each other.

In such inoperative state of the fifth gear shifting synchronizing mechanism 102, the fifth gear fork head 126 is prevented from moving to the right in FIG. 8 by a side wall of the transmission case 33 and is movable only leftwards in FIG. 8 to bring the fifth gear shifting synchronizing mechanism 102 into an operative state. More specifically, a stepped portion 142 capable of abutting the fifth gear fork head 126 is formed on the end portion of the second fork shaft 120 on the side toward the transmission case 33, so when the second fork shaft 120 is moved to the left, the fifth gear fork head 126 moves leftwards in FIG. 8 while causing the ball 138 to move out of the recess 140 onto the outer surface of the first fork shaft 116 and compress the spring 137. As a result, the fifth gear shifting synchronizing mechanism 102 operates to establish the fifth gear train G5. Since the spring 137 is compressed and exhibits a large spring force during operation of the fifth gear shifting synchronizing mechanism 102, the second fork shaft 120 and the fifth gear fork head 126 are held substantially locked together by the detent mechanism of ball 139 and recess 140, so that when the second fork shaft 120 is moved back to the right, the fifth gear fork head 126 also moves rightwards and returns to the state shown in FIG. 8, rendering the fifth gear shifting synchronizing mechanism 102 inoperative.

Figure 11:
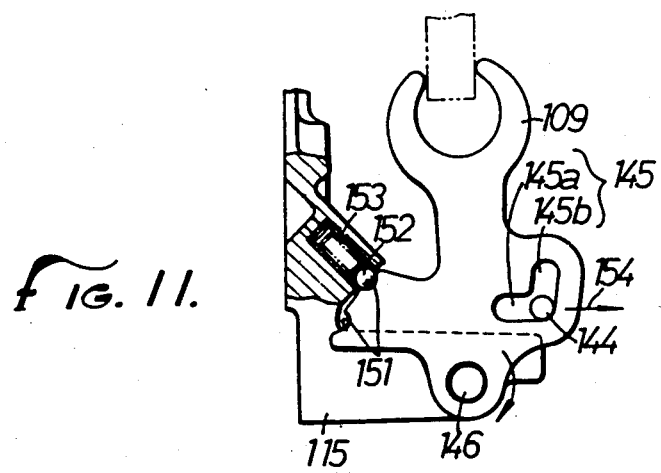
FIG. 11 is a plan view of a reverse shift fork as mounted on the shaft holder.

The reverse fork head 124 is provided with an engaging arm 143 whose fore end portion is formed in U-shape and engages the first fork shaft 116. The engaging arm 143 functions to stop rotation of the second fork shaft 120. An engaging pin 144 projects integrally from the reverse fork head 124. As shown in FIG. 11, the engaging pin 144 is engaged with an L-shaped through hole 145 formed in the reverse shift fork 109. The reverse shift fork 109 is integrally provided with a support shaft 146 which is perpendicular to the axis of the second fork shaft 120 and which is inserted through a support hole 147 formed in the shaft holder 115. A retainer ring 148 is fitted on the portion of the support shaft 146 projecting from the support hole 147 and a pin 149 is inserted perpendicular to the ring 148 and support shaft 146, whereby the reverse shift fork 109 is supported by the shaft holder 115 for pivoting about the axis of the support shaft 146. In a neutral position of the reverse shift fork 109, the through hole 145 comprises a portion 145a parallel to the second fork shaft 120 and a portion 145b perpendicular to the second fork shaft 120, the parallel and perpendicular portions 145a and 145b being contiguous to each other in the form of an L. When the second fork shaft 120 is in a neutral position in which it moves to neither left nor right as shown in FIG. 8, the engaging pin 144 is positioned in the corner portion of the through hole 145.

To control the pivotal operation and positions of the reverse shift fork 109, two recesses 151 are formed on a side edge of the reverse shift fork 145 and a ball 152 capable of fitting in the recesses 151 is supported the shaft holder 115 and urged by spring 153 in the engaging direction. When the ball 152 is fitted in one recess 151 as shown in FIG. 11, the engaging pin 144 is positioned in the corner portion of the through hole 145. In this state, if the second fork shaft 120 is moved rightwards in FIG. 8, that is, if the engaging pin 144 is moved in the direction of arrow 154, the reverse shift fork 109 pivots in a clockwise direction, as shown in FIG. 11, and the ball 152 engages the other recess 151. Upon this clockwise movement of the reverse shift fork 109, the idle gear 107 moves to establish the reverse gear train Gr.

To release the establishment of the reverse gear train Gr, the second fork shaft 120 is moved to the left into the state shown in FIG. 8. At this time, the reverse shift fork 109 pivots counterclockwise into such a neutral state as shown in FIG. 11. When the second fork shaft 120 is moved leftwards from its state shown in FIG. 8 to operate the fifth gear shifting synchronizing mechanism 102, the engaging pin 144 merely moves along the parallel portion 145a of the through hole 145 and the reverse shift fork 109 is not moved pivotally.

The ultra-low fork head 123 is formed with an engaging groove 156. A rotation preventing rod 157 which is fixed at a base end thereof to the shaft holder 115 and which extends in parallel with the first fork shaft 116 engages the engaging groove 156, whereby the ultra-low fork head 123 is prevented from pivoting about the first fork shaft 116.

To the third fork shaft 121 is fixed a connection member 158, which is connected to the ultra-low fork head 123 through a lever 159. The lever 159 is of a generally L-shape and it is provided at one end thereof with a spherical engaging portion 160 which is fitted in an engaging hole 161 formed in the ultra-low fork head 123. The connection member 158 is integrally provided with a connecting pin 162 which projects in a direction perpendicular to the third fork shaft 121. A U-shaped engaging portion 163 provided at the other end of the lever 159 engages the connecting pin 162. The corner portion 159a of the L-shaped lever 159 is pivotally supported by a pivot pin 164 which is perpendicular to the first and third fork shafts 116 and 121.

With reference particularly to FIG. 2, the lever 159 is disposed in a relatively large space, namely between the third and fourth gear trains G3 and G4 in the main speed change mechanism 36, and the pivot pin 164 is fixed to the side wall of the transmission case 33. The pivot pin 164 comprises, successively from one end side thereof as shown in FIG. 9, a head portion 165 of a large diameter, an external thread portion 166 which is threadedly engaged with the side wall of the transmission case 33, and a pivot portion 167 of a small diameter which is inserted in a pivot hole 168 formed in the corner portion 159a of the lever 159. The pivot pin 164 is threadly attached to the side wall of the transmission case 33 from the exterior of the case.

Thus, the lever 159 is pivotally supported at its intermediate corner portion by the pivot pin 164 and thereby allowed to pivot to perform a motion reversing function. More particularly, when the ultra-low fork head 123 is moved to the left in FIG. 8, the connection member 158, third fork shaft 121 and ultra-low shift fork 112 move to the right to in turn cause the select sleeve 111 to move to the right in FIG. 2 to establish the reduction gear train 78 of the sub speed change mechanism 37. If the ultra-low fork head 123 then is moved to the right, the connection member 158, third fork shaft 121 and ultra-low shift fork 112 move to the left and the select sleeve 111 moves to the left in FIG. 2 to disengage the reduction gear train 78 and the counter shaft 71 from each other.

In order to perform such left- and rightward movement of the third fork shaft 121 in a controlled manner, a pair of axially spaced recesses 169 are formed on the outer surface of an end portion of the third fork shaft 121 toward the side of the transmission case 33, and a ball 170 adapted to fit in each recess 169 is urged in a direction of engagement with each recess 169 by means of a spring 171.

As shown in FIG. 8, when the ball 170 is fitted in the right-hand recess 169, the ultra-low shift fork 109 maintains the ultra-low gear shifting synchronizing mechanism 110 inoperative. If the third fork shaft 121 then is moved to the right, allowing the ball 170 to engage the left-hand recess 169, the ultra-low gear shifting synchronizing mechanism 110 becomes operative.

Figure 13:
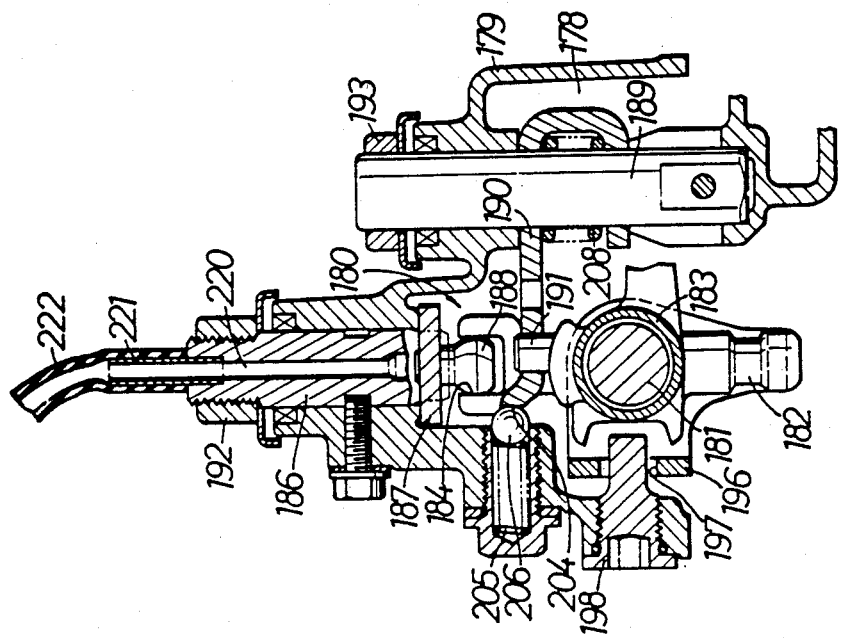
FIG. 13 is a sectional view taken substantially on the line XIII—XIII of FIG. 12.
Figure 12:
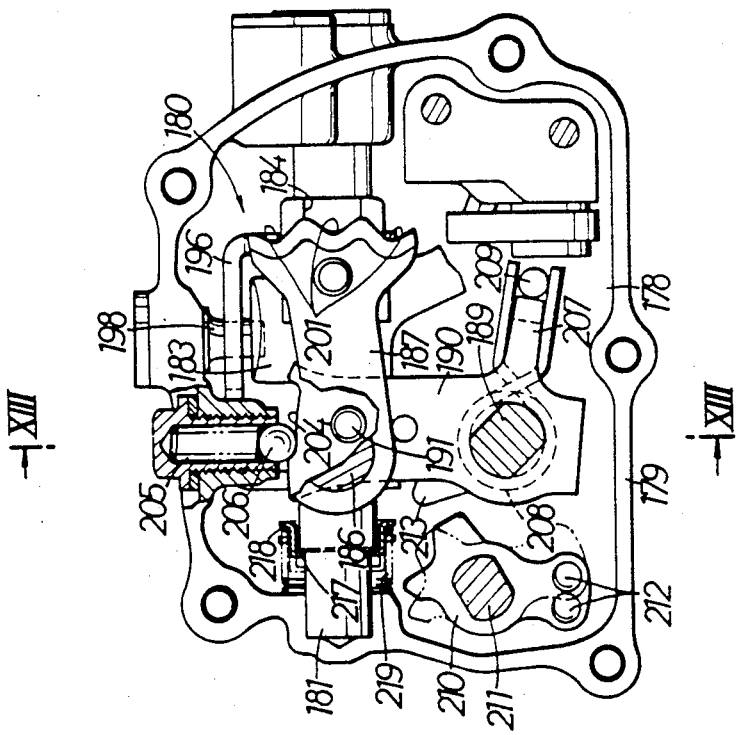
FIG. 12 is a partially cut-away plan view of a select/shift mechanism.

The ultra-low fork head 123, first/second gear shifting fork head 122, third/fourth gear shifting fork head 125, and reverse fork head 124 are provided with an ultra-low retaining portion 172, first/second gear shifting retaining portion 173, third/fourth gear shifting retaining portion 174 and fifth/reverse shifting retaining portion 175, which are all open in U-shape and arranged in this order from the first fork shaft 116 toward the second fork shaft 120, as shown in FIG. 8. Referring also to FIGS. 12 and 13, a cover 179 is fixed to an upper portion of the clutch case 32 to define an operation chamber 178 which communicates with the interior of the transmission case 33. Within the operation chamber 178 is disposed a select/shift mechanism 180 for effecting selection and operation of the retaining portions 172, 173, 174 and 175.

The select/shift mechanism 180 will now be described in detail. To the cover 179 is fixedly attached a shift piece shaft 181 which extends in a direction perpendicular to the fork shafts 116, 120 and 121. Supported slidably and rotatably by the shift piece shaft 181 is a shift piece 183 which is integrally provided with an engaging arm 182 capable of selectively engaging the retaining portions 172, 173, 174 and 175. The shift piece 183 is formed with an engaging groove 184 for allowing rotation extending parallel to the shift piece shaft 181 and an engaging groove 185 for allowing sliding motion extending perpendicularly to the shift piece shaft 181.

Slidably fitted in the engaging groove 184 for rotation is a spherical end portion 188 of a shift arm 187 which is supported by the cover 179 pivotably through a shift shaft 186. Slidably engaged with the engaging groove 185 for sliding motion is a pin-like end portion 191 of a select arm 190 which is supported by the cover 179 pivotably through a select shaft 189. The shift shaft 186 and the select shaft 189 extend in a direction perpendicular to the shift piece shaft 181 and project from the cover 179. The shift arm 187 and the select arm 190 are fixed to the shift shaft 186 and select shaft 189 nearly perpendicularly to each other within the operation chamber 178. Further, outside the cover 179, a shift lever 192 and a select lever 193 are fixed to the shift shaft 186 and select shaft 189, respectively.

To the shift lever 192 is connected a terminal end of a shifting wire 194, while to the select lever 193 is connected a terminal end of a select wire 195 (see FIG. 7). The wires 194 and 195 are of the type capable of performing push-pull operation according to the operation of a change lever (not shown). The select wire 195 performs push-pull operation according to displacement of the change lever in the neutral position N, while the shifting wire 194 effects push-pull operation according to movement of the change lever to the shift position SL, 1st, 2nd, 3rd, 4th, 5th or R.

On the shift piece shaft 181 is slidably mounted an interlock plate 196 of a C-shape with the shift piece 183 held therein. The interlock plate 196 is formed with a slot 197 extending in parallel with the shift piece shaft 181 and by reason of the engagement of a pin member 198, which is threadedly secured to the cover 179, with the slot 197 the rotation of the interlock plate 196 is prevented.

Three recesses 201 are formed at the fore end of the shift arm 187 and a ball 202 capable of engaging the recesses 201 is urged in the direction of engagement with those recesses by means of a spring 203 which is disposed within the cover 179, whereby the shift arm 187 may be pivoted in a controlled manner among three positions. These three positions correspond to the positions for shifting of the retaining portions 172, 173, 174 and 175 by the shift piece 183 according to the shift pattern shown in FIG. 6.

The fore end of the select arm 190 is formed with an accurately extending recess 204 around the shift shaft 186 at a length corresponding to the movement of the shift piece 183 which is done for selection of the retaining portions 172, 173, 174 and 175. A ball 206 is in resilient sliding contact with the recess 204 by means of a spring 205 which is disposed within the cover 179. Further, the select arm 190 is integrally provided with an arm portion 207 and both ends of a torsion spring 208, which surrounds the select shaft 189, extend to both sides of the arm portion 207 and engage a retaining pin 209 projecting from the cover 179. The torsion spring 208 exhibits a spring force in the direction of returning the select arm 190 to the original position when the arm 190 pivots to select a shift stage upon pivotal motion of the select shaft 189, thereby giving an appropriate operation feeling to the driver operating the change lever.

On the side where the shift piece 183 engages the ultra-low retaining portion 172 and in a position adjacent to the select shaft 189, an ultra-low interlock plate 210 is pivotally supported on the cover 179 by a pivot shaft 211 which is parallel to the select shaft 189. The ultra-low interlock plate 210 is pivotable between a position in which the movement of the select shaft 189 is prevented until selection of the ultra-low gear and a position in which such movement is allowed. In order to perform the pivotal motion between those positions in a controlled manner, the ultra-low interlock plate 210 has a pair of recesses 212. On the side of the cover 179 there is disposed a ball (not shown) capable of fitting in the recesses 212, under spring bias in the direction of engagement with those recesses.

The select arm 190 is provided with a projection 213. When the ultra-low interlock plate 210 is in its pivoted position for preventing the selection of the ultra-low gear, the projection 213 abuts the ultra-low interlock plate 210 to prevent any further pivotal motion, whereby the shift piece 183 is unable to engage the ultra-low retaining portion 172 and the selection of the ultra-low gear is prevented.

The pivot shaft 211 projects from the cover 179 and is connected to the gear clutch mechanism 55 in the transfer 5 for interlocking. More specifically, as shown in FIG. 7, the rocking shaft 61 in the gear clutch mechanism projects from the clutch case 32 and a connecting lever 214 extends radially outwardly from the projecting end 61a of the rocking shaft 61. A connecting lever 215 projects radially outwardly from a projecting end of the pivot shaft 211 and the levers 214 and 215 are interconnected through a connecting rod 216. This connection is arranged so that when the gear clutch mechanism 55 becomes disengaged, the ultra-low interlock plate 210 is pivoted to the position in which it can abut the projection 213 of the select shaft 189 to prevent selecting of the ultra-low gear.

The shift piece shaft 181 has a stepped portion 217 facing one end and a dish-like abutting flange 128 is slidably mounted on the shift piece shaft 181 in a position to abut the stepped portion 217. Between the flange 218 and the cover 179 is disposed a malfunction preventing spring 219 whereby the abutting flange 218 is urged toward the stepped portion 217.

The abutting flange 218 also is adapted to abut the interlock plate 196 moving on the shift piece shaft 181 integrally with the shift piece 183 and, in a state of abutment of the butting flange 218 with the stepped portion 217, the interlock plate 196 comes into abutment with the abutting flange 218 when the shift piece 183 is in the position for selecting the first or second gear. Therefore, when the shift piece 183 is moved from the position for selecting the first or second gear to the position for selecting the ultra-low gear, the abutting flange 218 must be pushed and moved against the biasing force of the malfunction preventing spring 219.

The shift shaft 186 is formed with a breather hole 220 extending between the operation chamber 178 and a small diameter connecting pipe 221 which is further connected to a conduit 222.

The operation of this embodiment will now be described. Upon operation of the change lever according to the shift pattern shown in FIG. 6, the select wire 195 and the shifting wire 194 perform push-pull operation and the select/shift mechanism 180 operates in response thereto to establish a desired gear train in the transmission 3. More particularly, when the first gear is to be selected, the shift piece 183 slides on the shift piece shaft 181 and engages the first/second gear shifting retaining portion 173, then the shift piece 183 pivots clockwise, as viewed in FIG. 13, so that the first/second gear shifting retaining portion 173, the first/second gear shifting fork head 122 and the first/second gear shift fork 98 move to the left in FIG. 8 to establish the first gear train G1. The second gear can be selected by pivoting the shift piece 183 counterclockwise in FIG. 13, which causes a rightward movement of the first/second gear shift fork 98 in FIG. 8 to establish the second gear train G2.

In selecting the third and fourth gears, the shift piece 183 pivots in the position corresponding to the third-/fourth gear shifting retaining portion 174 to thereby selectively establish the third gear train G3 and the fourth gear train G4. In selecting the fifth and reverse gears, the shift piece 183 pivots in the position corresponding to the fifth/reverse shifting retaining portion 175 to thereby selectively establish the fifth gear train G5 and the reverse gear train Gr.

In selecting the ultra-low gear, the shift piece 183 engages the ultra-low retaining portion 172 and pivots clockwise in FIG. 13, so that the ultra-low fork head 123 slides leftwards in FIG. 8. This movement of the fork head 123 is converted through the lever 159 and connection member 158 into a rightward movement of the third fork shaft 121 and ultra-low shift fork 112, and the sleeve 111 moves rightwards in FIG. 2 to establish the reduction gear train 78, whereby the driving force of the input shaft 38 is transmitted to the output shaft 39 through the sub speed change mechanism 37 and the output of the shaft 39 is transmitted at an ultra-low speed to the differential gear 4 and then to the transfer 5.

When the gear clutch mechanism 55 of the transfer 55 is in a disengaged state, the projection 213 of the select arm 190 of the select/shift mechanism 180 is in a position capable of engaging the ultra-low interlock plate 210 as shown in solid line in FIG. 12, and the select shaft 189 is prevented from pivoting to the position of engagement of the shift piece 183 with the ultra-low retaining portion 172. Thus, it is only during all-wheel driving in an engaged state of the gear clutch mechanism 55 that the ultra-low gear can be selected.

In the transmission 3 of the present invention, the shift shaft 186 and the select shaft 189 are rotated each independently by a shift wire 194 and a select wire 195, respectively, and in accordance with the resulting pivotal motions of the shift arm 187 and select arm 190, the shift piece 183 rotates or slides on the shift piece shaft 181 to select a shift stage. Thus, the shift mechanism 180 is of a simplified construction that uses push-pull type shift wire 194 and select wire 195. As a result, the layout of the transmission 3 can be easily changed by merely changing the mounting direction of the shift lever 192 and select lever 193.

Further, since the detent mechanism 199 and 200 are provided between the shift and select arms 187, 190 and the cover 179, a positive control and location feeling is provided for the driver during select and shift operations.

The invention claimed is:

1. A vehicular transmission select/shift mechanism within a housing portion of a transmission having a plurality of forward and reverse gear trains selectively established by shift forks, comprising a shift piece shaft mounted in said housing portion, a shift piece slidably and rotatably supported on said stationary shift piece shaft for engaging said shift forks to establish said gear trains selectively, a select shaft rotatably supported in said housing portion and driven by a select operating member, a shift shaft rotatably supported in said housing portion and driven by a shift operating member, a select arm operably engaging said shift piece and fixed on said select shaft, and a shift arm operably engaging said shift piece and fixed on said shift shaft.

2. A vehicular transmission as set forth in claim 1, wherein said select arm and said shift arm are disposed approximately perpendicularly to each other, and said select arm is positioned between the shift piece shaft and the shift arm.

3. A vehicular transmission as set forth in claim 1, wherein said select operating member includes a select lever attached to said select shaft, said shift operating member includes a shift lever attached to said shift shaft, and said select lever and shift lever are positioned approximately in parallel with each other.

4. A vehicular transmission as set forth in claim 1 wherein said gear trains include an ultra-low speed gear train for all-wheel operation, an ultra-low speed shift fork for selecting that ultra-low speed gear train, and means for preventing said shift piece from operating said ultra-low speed shift fork unless the transmission is selectively connected for all-wheel operation.

5. A vehicular transmission as set forth in claim 4 wherein said means includes an interlock plate for selectively engaging and limiting the pivoting of said select arm for preventing selection of said ultra-low speed shift fork.

6. A vehicular transmission as set forth in claim 1 wherein said select shaft and arm are rotated to move said shift piece to a location for engaging a selected shift fork and said shift shaft and arm are rotated to move the selected shift fork to establish the selected gear train.

7. A vehicular transmission as set forth in claim 6 wherein a select lever is connected to said select shaft outside said housing portion, a shift lever is connected to said shift shaft outside said housing portion, and separate push-pull wires are connected to said select lever and shift lever for selectively causing said rotation of said select shaft and arm and said shift shaft and arm, respectively.

8. A vehicular transmission as set forth in claim 6 wherein detent means are provided for controlling the rotated positions of said select shaft and arm.

9. A vehicular transmission as set forth in claim 8 wherein detent means are provided for controlling the rotated position of said shift shaft and arm.

10. A vehicular transmission as set forth in claim 6 wherein detent means are provided for maintaining the selected position of said interlock plate.

11. A vehicular transmission having a select/shift mechanism housed within an operation chamber defined by a transmission wall member, said select/shift mechanism including a shift piece for selecting shift forks corresponding to a plurality of forward and reverse gear train shifting stages, said shift piece being supported slidably and rotatably on a stationary shift piece shaft to establish said shifting stages selectively, a select shaft driven by a select operating member, a shift shaft driven by a shift operating member, said select shaft and shift shaft being rotatably supported by said wall member, a select arm engaging said shift piece and integral with said select shaft, a shift arm engaging said shift piece and integral with said shift shaft, and detent means for effecting a controlled pivotal movement of the select arm and the shift arm are provided between both said arms and said wall member.

12. A vehicular transmission having a main speed change mechanism provided with gear trains in plural shifting stages capable of being established selectively, and a sub speed change mechanism provided with a reduction gear train for attaining an ultra-low speed lower than a lowest shifting stage in said main speed change mechanism, comprising, a shift piece for selecting the establishment of each said gear train slidably supported on a shift piece shaft, a select arm engaging said shift piece and fixed on a select shaft rotatable about an axis perpendicular to the shift piece shaft, the position of selection of each said gear train by said shift piece is set so that a position which permits selection of each gear train in the main speed change mechanism and a position which permits selection of the reduction gear train in the sub speed change mechanism are displaced from each other in the axial direction of the shift piece shaft, projection means on said select shaft, and an interlock plate capable of abutting said projection means movable between a first position in which the rotation of the select shaft in a direction for causing movement of the shift piece to said position of selecting the reduction gear train is prevented and a second position in which said rotation is permitted.

* * * * *